United States Patent [19]
Cadotte et al.

[11] Patent Number: 5,658,460
[45] Date of Patent: Aug. 19, 1997

[54] USE OF INORGANIC AMMONIUM CATION SALTS TO MAINTAIN THE FLUX AND SALT REJECTION CHARACTERISTICS OF REVERSE OSMOSIS AND NANOFILTRATION MEMBRANES DURING DRYING

[75] Inventors: John E. Cadotte, Minnetonka, Minn.; Daniel A. Batzel, Glenview, Ill.; Thomas F. Stocker, San Diego, Calif.

[73] Assignee: The Dow Chemical Company, Midland, Mich.

[21] Appl. No.: 646,411

[22] Filed: May 7, 1996
(Under 37 CFR 1.47)

[51] Int. Cl.$^6$ .................................................. B01D 39/00
[52] U.S. Cl. ........................ 210/500.38; 210/500.37; 210/490; 264/45.1; 264/48
[58] Field of Search ................ 210/500.37, 500.38, 210/500.39, 490; 264/41, 48, 49, 45.1; 427/244

[56] References Cited

U.S. PATENT DOCUMENTS

| | | | |
|---|---|---|---|
| 4,360,434 | 11/1982 | Kawaguchi et al. | 210/500.28 |
| 4,812,238 | 3/1989 | Cadotte et al. | 210/500.38 |
| 4,872,984 | 10/1989 | Tomaschke | 210/500.38 |
| 4,888,116 | 12/1989 | Cadotte et al. | 210/500.38 |
| 4,948,507 | 8/1990 | Tomaschke | 210/500.38 |
| 4,983,291 | 1/1991 | Chau et al. | 210/490 |
| 5,254,261 | 10/1993 | Tomaschke et al. | 210/490 |
| 5,368,889 | 11/1994 | Johnson et al. | 427/244 |

*Primary Examiner*—Ana Fortuna

[57] ABSTRACT

To prevent the deterioration of the flux and salt rejection characteristics of polyamide, thin-film, composite reverse osmosis membranes when subjected to relatively high temperature drying conditions, an unsubstituted inorganic ammonium cation salt of an acid is incorporated into the process of manufacture. The ammonium salt can be introduced into the process either before or after the membrane is formed by interfacial polymerization so long as it is added before the membrane is heated.

6 Claims, No Drawings

USE OF INORGANIC AMMONIUM CATION SALTS TO MAINTAIN THE FLUX AND SALT REJECTION CHARACTERISTICS OF REVERSE OSMOSIS AND NANOFILTRATION MEMBRANES DURING DRYING

FIELD OF THE INVENTION

The present invention concerns a process for manufacturing reverse osmosis and nanofiltration membranes. More particularly, the present invention concerns the use of unsubstituted inorganic ammonium cation salts to preserve the flux and salt rejection characteristics of membranes that are subjected to thermal drying.

BACKGROUND OF THE INVENTION

Reverse osmosis and nanofiltration membranes, particularly interfacially polymerized polyamide thin-film composite membranes, are typically prepared from polyamine monomer and polyfunctional acyl halide monomer; see, for example, U.S. Pat. No. 4,277,344. Such membranes are useful for the separation of dissolved substances, e.g., salts, from solvents, e.g., water. Thus, potable or less salty water can be obtained from seawater, contaminated water, brackish water or brine by reverse osmosis. For practical applications, the flux, i.e., the flow rate across the membrane, should exceed about 5.9 liters/$m^2$-hour [10 gallons/$ft^2$-day (gfd)] and the salt rejection should exceed about 98 percent.

Reverse osmosis and nanofiltration membranes now receiving widespread commercial endorsement are obtained by interfacially condensing a polyfunctional acyl halide having a low aqueous solubility, viz., trimesoyl chloride, with a polyamine having a high water solubility, viz., m-phenylene diamine. In general, the aqueous solution of m-phenylene diamine is absorbed on a porous support and is interfacially contacted with a nonpolar organic liquid solution of trimesoyl chloride; see, for example, U.S. Pat. No. 4,277,344. In certain nanofiltration membranes, the m-phenylene diamine is replaced with piperazine; see for example, U.S. Pat. Nos. 4,769,148 and 4,859,384.

Because of its inertness, volatility, low toxicity and non-flammability, FREON™ 113 or 1,2,2-trichloro-1,1,2-trifluoroethane has traditionally been preferred as the non-polar organic solvent for the trimesoyl chloride. Recently, environmental concerns related to ozone depletion have provided the impetus to seek replacements for chlorofluorocarbons like FREON 113. Lower molecular weight hydrocarbons, such as hexane, are adequate substitute solvents with respect to inertness, volatility and toxicity, but low flash points and high flammability make hydrocarbons with fewer than 8 carbon atoms less than ideal replacements. Higher boiling hydrocarbons such as $C_8$–$C_{14}$ alkanes, on the other hand, while having more favorable flashpoints, are less volatile and require higher drying temperatures to be effectively removed from the membrane. When exposed to drying temperatures in excess of 60° C., reverse osmosis membranes suffer from serious reductions in flux and sometimes reductions in salt rejection. To prevent the loss of flux or salt rejection associated with heating at elevated temperatures, U.S. Pat. No. 5,368,889 suggests the use of a physical means not requiring a phase change for removing higher boiling hydrocarbon solvents, e.g., a water knife, an air knife, a roller or a rubber blade.

Alternatively, U.S. Pat. Nos. 4,872,984 and 4,948,507 disclose the use of monomeric tertiary and quaternary amine salts such as triethylamine camphor sulfonic acid to avoid the loss of flux when a composite polyamide thin film is heated to remove higher boiling hydrocarbon solvents. The amine salts are incorporated as necessary ingredients of the aqueous solution of polyamine which coats the porous support prior to interfacial contact with the nonpolar organic solution of polyfunctional acyl halide.

U.S. Pat. No. 4,983,291 discloses a method of maintaining high flux in dried reverse osmosis membranes by treating the membrane after formation and before drying with a solution of an acid or an amine salt of an acid, e.g., acetic acid and m-phenylene diamine, at a pH of less than 7.

While treatment of reverse osmosis membranes with amine salts, particularly tertiary and quaternary amine salts, effectively preserves the flux and salt rejection attributes of membranes subjected to drying at the relatively high temperatures required for removal of $C_8$ to $C_{14}$ hydrocarbon solvents, the process does suffer from several drawbacks. Amine salts, particularly those of tertiary and quaternary amines, are relatively expensive. Furthermore, treatment of waste streams containing quaternary and tertiary amine salts is usually difficult. Finally, quaternary and tertiary organic amines are often toxic and membranes treated with such materials need to be thoroughly washed out before being used in potable water or food contact applications. Therefore, it would be desirable to have a method of preserving flux and salt rejection in oven-dried reverse osmosis membranes which involves incorporation of an additive which is less expensive and less toxic and whose waste is more easily treatable.

SUMMARY OF THE INVENTION

It has now been found that incorporation of an unsubstituted inorganic ammonium cation salt of an acid into the process for manufacturing reverse osmosis and nanofiltration membranes which are thermally dried to remove higher boiling hydrocarbon solvents effectively maintains the flux and salt rejection characteristics of the membrane. The unsubstituted ammonium salts are cheaper and much less toxic than quaternary or tertiary amine salts and their waste streams are more easily treated. Surprisingly, the flux rate of membranes prepared by incorporating ammonium salts often exceeds the flux rate of membranes prepared by incorporating quaternary or tertiary organic amine salts. Thus, the present invention concerns an improved process for the preparation of a polyamide thin-film composite membrane in which:

(a) an aqueous solution of a polyamine monomer on a microporous support is interfacially contacted with a solution of a polyfunctional acyl halide monomer in a non-polar organic solvent having a boiling point greater than about 90° C. to form the membrane, (b) an additive is incorporated to maintain the membrane's flux and salt rejection characteristics, and (c) the membrane is dried by heating to a temperature of at least 60° C. to remove the non-polar organic solvent by a phase change, the improvement comprising incorporating an unsubstituted inorganic ammonium cation salt of an acid as the additive to prevent loss of flux and salt rejection and drying the membrane at a temperature from about 60° to about 120° C.

DETAILED DESCRIPTION OF THE INVENTION

Polyamide thin-film composite reverse osmosis and nanofiltration membranes are comprised of a microporous substrate which is coated with an ultrathin layer of crosslinked polyamide. The crosslinked polyamide coating is the discriminating layer which allows for the removal of dissolved substances from solvents.

Polyamide thin-film composite membranes are typically prepared by interfacial polymerizations in which (a) a microporous support is coated with an aqueous solution of a polyamine monomer, (b) the aqueous layer on the microporous support is contacted with a solution of a polyfunctional acyl halide in a non-polar organic solvent to form a crosslinked polyamide film, and (c) the film is dried to form the reverse osmosis membrane.

The microporous supports used in the present invention are not critical so long as the pore sizes are sufficiently large to permit the unhindered passage of permeate but not so large as to interfere with the bridging-over of the resulting thin-film reverse osmosis membrane. Typical pore sizes will range from 10 to 1,000 nanometers (nm). Suitable microporous supports include polymeric material made of polysulfones, polyarylether sulfones, polyimides or polyvinylidene fluoride, with polysulfone backing material being preferred. The thickness of the microporous support is usually 25 micrometers (µm) to 125 µm, preferably 40 µm to 75 µm.

The microporous support is generally coated either by hand or in a continuous operation with an aqueous solution of polyamine monomer. The polyamines may have primary or secondary amino groups and may be aromatic or aliphatic in nature. Preferred polyamines are primary aromatic amines having 2 or 3 amino groups, most especially m-phenylene diamine, and secondary aliphatic amines having 2 amino groups, most especially piperazine. The polyamine is applied to the microporous support as a solution in water. The aqueous solution contains from about 0.1 to about 20 weight percent, preferably from about 0.5 to about 6 weight percent, and most preferably from about 1 to about 4 weight percent polyamine.

After removing any excess of the aqueous solution of polyamine, the coated microporous support is contacted with a solution of a monomeric polyfunctional acyl halide in a non-polar organic solvent. The polyfunctional acyl halides are preferably aromatic in nature and contain at least 2 and preferably 3 acyl halide groups per molecule. Because of their lower cost and greater availability, chlorides are generally preferred over the corresponding bromides or iodides. The most preferred polyfunctional acyl halide is trimesoyl chloride.

The polyfunctional acyl halide is dissolved in a non-polar organic solvent in a range of from 0.01 to 5.0 percent by weight. Suitable non-polar organic solvents are those which are capable of dissolving polyfunctional acyl halides and which are immiscible with water. The non-polar organic solvents to which the invention particularly relates are those solvents which do not pose a threat to the ozone layer and yet are sufficiently safe in terms of their flashpoints and flammability to undergo routine processing without having to undertake extreme precautions. Higher boiling hydrocarbons, i.e., those with boiling points greater than about 90° C. such as $C_8$–$C_{14}$ hydrocarbons and mixtures thereof, have more favorable flashpoints than their $C_5$–$C_7$ counterparts but they are less volatile. Thus, after the aqueous solution of polyamine coated on the microporous support reacts interfacially when contacted with the organic solution of the polyfunctional acyl halide to form a crosslinked polyamide thin film, the organic solvent must be removed. The removal of solvent is most conveniently achieved by drying at elevated temperatures. However, when exposed to temperatures in excess of 60° C. membranes of crosslinked polyamides, particularly those derived from m-phenylene diamine and trimesoyl chloride, have a tendency to exhibit a deterioration in flux and/or salt rejection.

To counteract the loss of flux and/or salt rejection experienced upon drying the membranes at temperatures above 60° C., tertiary or quaternary organic amine salts have been incorporated into the membrane manufacturing process. In the present invention, unsubstituted inorganic ammonium cation salts of acids have been found to be just as effective, if not more so, in preventing a reduction of the flux and salt rejection properties of the membrane. Unsubstituted inorganic ammonium cation salts of acids refers solely to $NH_4^+$ salts of acids.

The acids may be inorganic oxo acids such as sulfuric or phosphoric acid or organic acids such as aliphatic or aromatic carboxylic or sulfonic acids. Preferably, the acids are non-volatile and have boiling points greater than about 120° C. The preferred additives are the unsubstituted ammonium salts of organic carboxylic or sulfonic acids such as, for example, citric acid, gluconic acid or camphorsulfonic acid. The unsubstituted ammonium salt is introduced either as a liquid, a solid or, preferably, in an aqueous solution.

The additive is incorporated into the process either before or after the membrane is formed.

In one embodiment, the microporous support is coated with a first aqueous solution containing about 0.25 to about 10 weight percent, preferably about 1 to about 8 weight percent of the unsubstituted inorganic ammonium cation salt of an acid. The pH of the first aqueous solution is adjusted to at least 5.5 by controlling the concentration of the unsubstituted inorganic ammonium cation salt or by adding the acid and controlling the amount of ammonium reagent, e.g., $NH_4OH$, used to neutralize the acid. The microporous support is then coated with a second aqueous solution containing the polyamine reactant. The coating amounts are generally adjusted so that the weight ratio of ammonium salt to polyamine reactant is about 0.1 to 4.0, preferably about 0.5 to 3.5.

In order to save a step in the process, a single aqueous solution containing a combined 0.25 to 10 weight percent of the unsubstituted ammonium salt and the polyamine reactant is used. In this case the pH of the single aqueous solution is adjusted to at least 5.5 and the weight ratio of the unsubstituted ammonium salt to the polyamine reactant is also adjusted to about 0.1 to 4.0, preferably about 0.5 to 3.5.

The aqueous solutions are coated on the microporous substrates by any well known means such as dipping, spraying, roller coating or rod coating and are allowed to react for about 5 seconds to 10 minutes.

If desired, the aqueous solutions may contain a surfactant for improved results. The particular surfactant employed is not critical and includes such common surfactants as sodium dodecylbenzene sulfonate, sodium lauryl sulfate, sodium dodecylphenoxybenzene sulfonate or mixtures thereof. The surfactants are generally employed at a concentration of about 0.01 to 0.5 weight percent.

After forming a liquid layer containing the unsubstituted ammonium salt and the polyamine reactant on the microporous support, an organic solvent solution containing about 0.05 to 5.0 weight percent of a polyfunctional acyl halide is coated thereon and allowed to react for about 5 seconds to 10 minutes while the thin-film polyamide membrane is formed.

After each step of coating with the aqueous and organic solvent solutions, the excess solutions are drained off. After the last coating and draining step, the resulting membrane is dried in an oven at a temperature from about 60° to about 120° C.

Alternatively, the unsubstituted inorganic ammonium cation salt additive can be incorporated into the process after the membrane is formed but before it is dried. The treatment with the unsubstituted ammonium salt additive may be applied directly after recovering the membrane from the organic solvent solution or after the excess organic solution is removed and the membrane is washed. The membrane is contacted with an aqueous solution containing about 0.25 to about 10 weight percent, preferably about 1 to about 8 weight percent of the unsubstituted inorganic ammonium cation salt. As in the previous embodiment, this solution is contacted with the membrane by dipping, spraying, roller coating, etc., and the contact is maintained from about 5 seconds to 10 minutes. After treatment with the aqueous solution of unsubstituted inorganic ammonium cation salt additive, the membrane is drained and dried in an oven at a temperature from about 60° to about 120° C.

The following examples serve to illustrate the invention.

EXAMPLE 1

A polysulfone support film was cast on a glass plate using a 15 weight percent Udel™ P3500 polysulfone solution in dimethylformamide (DMF). A 152 μm (6 mil) applicator was used to spread the casting solution and the glass plate was immersed into water at room temperature to quench the polysulfone support film. The surface of the microporous polysulfone support film was then contacted with an aqueous solution containing 2.0 percent gluconic acid neutralized to pH 6 with ammonium hydroxide, 2.0 percent m-phenylenediamine (MPD), 0.2 percent Dowfax™ 2A1 anionic surfactant (sodium dodecylphenoxybenzene sulfonate). The pH of the final solution was adjusted to pH 6 with ammonium hydroxide. After approximately one minute (min) of contact, the excess amine solution was removed by pressing the support surface with a soft rubber roller. The surface was then contacted with a solution containing 0.1 percent trimesoyl chloride (TMC) in Isopar™ G. After one min of contact, the excess TMC solution was decanted. The membrane surface was then pressed with a soft rubber roller to remove residual solvent from the surface. The membrane was then dried in a forced draft oven at 95° C. for five min. The membranes were tested on a flat cell test line for 2 hours (hr) at 1.38 MPa (200 psi) using a 0.2 percent NaCl feed. Test results gave an average flux of 11.2 L/m²-hr (19.0 gfd) with average salt passage of 1.4 percent. Membrane made in a similar manner except that no ammonium salt of gluconic acid was present in the aqueous amine solution gave an average flux of 4.6 L/m²-hr (7.9 gfd) with an average salt passage of 0.7 percent.

EXAMPLE 2

The procedure of Example 1 was repeated substituting a 1.7 percent solution of phosphoric acid for the 2.0 percent solution of gluconic acid. Again, the aqueous solution, containing the phosphoric acid in this case, was neutralized to pH 6 with ammonium hydroxide. The membrane had an average flux of 13.0 L/m²-hr (22.1 gfd) with an average salt passage of 1.6 percent.

EXAMPLE 3

The surface of a water wet microporous polysulfone film backed by a nonwoven support was coated with a 2.5 weight/volume percent aqueous solution of MPD. After allowing the solution to contact the polysulfone surface for 2.5 min, the excess MPD solution was removed using a nip roller. Next the surface was coated with 0.12 weight/volume percent solution of TMC in n-decane. After 1 min, the surface of the membrane was rinsed with n-decane. Half of the membrane was immersed in water and used as a control. The other half of the membrane was placed in a bath containing a 5 weight/volume percent solution of ammonium camphorsulfonate. After 2 min, the membrane in the ammonium salt bath and a portion of the membrane in the water bath were removed and dried in an oven at 95° C. for 5 min. The control and oven dried membranes were tested using a feed solution of 2,000 ppm NaCl at 1.55 MPa (225 psi) after equilibrating at 2.90 MPa (420 psi) for 1 hr. The results were as follows:

|  | Flux | | Percent NaCl |
| --- | --- | --- | --- |
|  | L/m²-hr | GFD | Rejection |
| Control A* | 12.9 | 21.9 | 98.5 |
| Control B** | 1.0 | 1.7 | 97.1 |
| Example 3*** | 15.4 | 26.1 | 98.4 |

*no additives; no oven drying
**no additive; oven dried
***NH$_4$+ additive; oven dried

What is claimed is:

1. An improved process lot the preparation of a polyamide thin-film composite membrane in which:

(a) an aqueous solution of a polyamine monomer is interfacially contacted with a solution of a polyfunctional acyl halide monomer in a non-polar organic solvent having a boiling point greater than about 90° C. to form the membrane;

(b) an additive is incorporated to maintain the membrane's flux and salt rejection characteristics, and (c) the membrane is dried by heating to a temperature of at least 60° C. to remove the non-polar organic solvent by a phase change, the improvement comprising incorporating an unsubstituted inorganic ammonium cation salt of an acid as the additive to prevent loss of flux and salt rejection and drying the membrane at a temperature from about 60° to about 120° C.

2. The process of claim 1 in which the non-polar organic solvent is a $C_8$–$C_{14}$ hydrocarbon or mixture thereof.

3. The process of claim 1 in which the unsubstituted inorganic ammonium cation salt is incorporated into the process before the interfacial polymerization forms the membrane.

4. The process of claim 1 in which the unsubstituted inorganic ammonium cation salt is incorporated into the process after the membrane has been formed but before the membrane is dried.

5. The process of claim 1 in which the acid is an aliphatic or aromatic carboxylic or sulfonic acid.

6. The process of claim 1 in which the acid is sulfuric or phosphoric acid.

\* \* \* \* \*